Jan. 1, 1963
G. E. TERNENT
3,070,960
SYNCHRONIZED HYDRAULIC REMOTE CONTROL SYSTEM
Filed Aug. 3, 1960
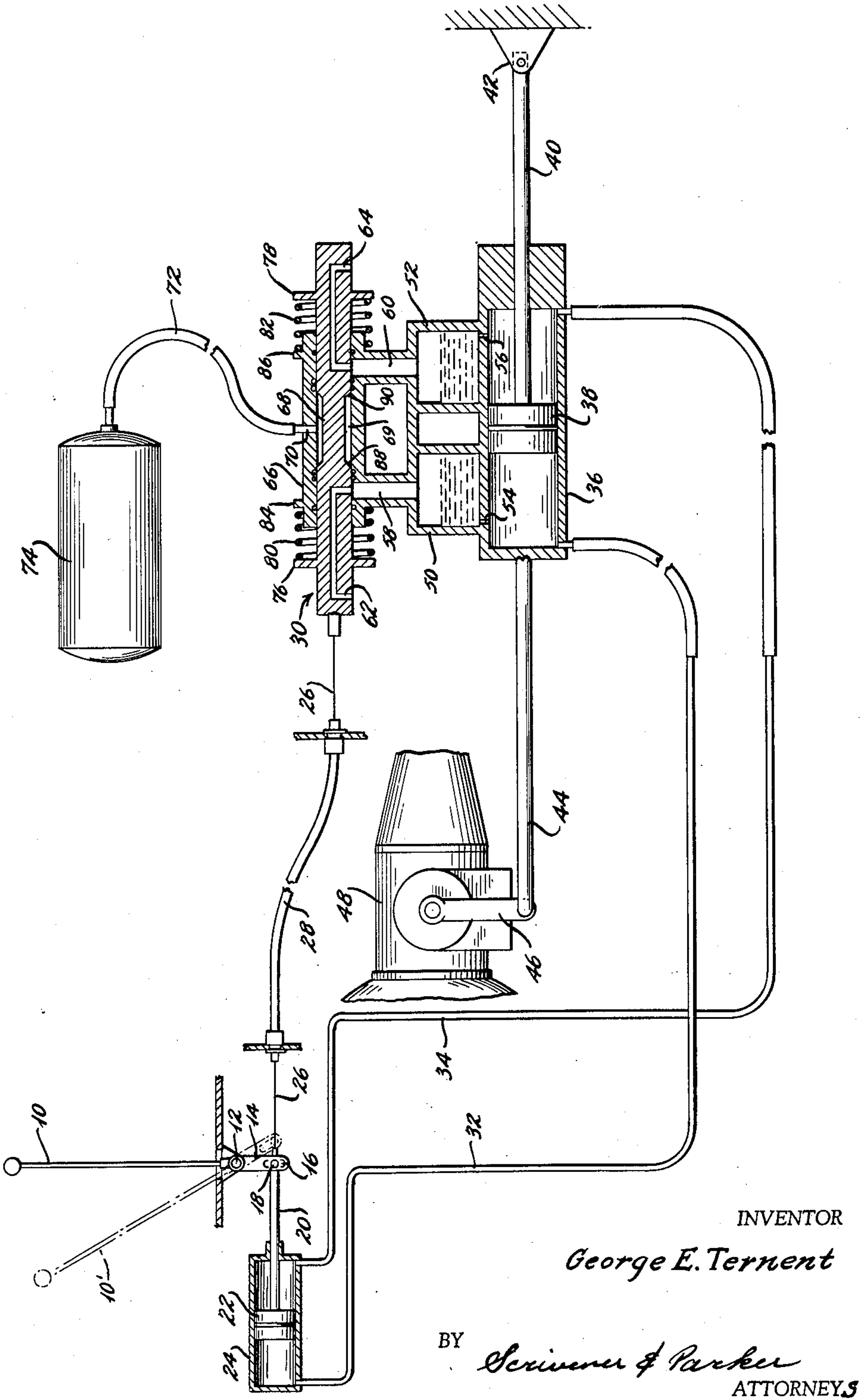
INVENTOR
George E. Ternent
BY Scrivener & Parker
ATTORNEYS United States Patent Office 3,070,960
Patented Jan. 1, 1963

3,070,960

SYNCHRONIZED HYDRAULIC REMOTE CONTROL SYSTEM

George E. Ternent, Elyria, Ohio, assignor to Bendix-Westinghouse Automotive Air Brake Company, Elyria, Ohio, a corporation of Delaware Filed Aug. 3, 1960, Ser. No. 47,298
9 Claims. (Cl. 60—54.5)

This invention relates to remote control systems and more particularly to hydraulic remote control systems wherein a slave unit is driven in response to movement of a master unit, a particular feature of the invention residing in means for automatically maintaining the master and slave units in synchronism.

Hydraulic remote control systems of the type wherein a master unit in the form of an hydraulic piston and cylinder is connected by a closed hydraulic circuit to a slave piston and cylinder are well known. In these systems relative movement between the master piston and its cylinder causes a transfer of hydraulic fluid to the slave piston and cylinder so that these have relative movement with respect to each other corresponding to the movement of the master unit. Such systems perform satisfactorily but because of leakage or for other reasons the master and slave units occasionally get out of synchronism so that on one side of the closed circuit there is more fluid than on the other with the result that when the master piston is in one position the slave piston is not in the same corresponding position. In many fields of use a lack of synchronism between master and slave units does not create difficulty but where such systems are used for the remote control of automotive gear shifters, lack of synchronism or feel can cause difficulties because it is of such magnitude that the gears cannot be fully or properly engaged.

An object of the present invention is to provide an improved means for insuring that at all times master and slave units of an hydraulic remote control system are synchronized.

Still another object of the invention is to provide synchronization means for hydraulic master and slave remote control units which is particularly, though not exclusively, suited for use with automotive gear shift mechanism.

Another object of the invention is to provide a means whereby the reaction of the engaging element can be sensed at the initiating point of force application.

Other objects and their attendant advantages will become apparent as the following detailed description is read in conjunction with the accompanying drawings wherein the single FIGURE is a schematic view of a hydraulic master-slave remote control system for automotive gear shift employing the synchronizing means of the invention.

Referring now to the drawing, 10 designates an automotive gear shift lever which is normally located adjacent the operator in the front part of the vehicle. The lever is pivotally mounted at 12 and has integral therewith a downward extension 14 which is slotted at 16 to receive a pin 18 integrally connected to a piston rod 20 whose opposite end is connected to a piston 22 slideably received in a stationary cylinder 24. Connected also to the end of the extension 20 is one end of a Bowden wire 26 which extends rearwardly through a suitably supported guide cable 28 and is attached at its opposite end to a slide or spool valve member 30 whose structure and function is hereinafter described in detail.

The cylinder 24 is filled with hydraulic fluid on opposite sides of the piston 22 and connected to the opposed ends of the cylinder are a pair of fluid conduits 32, 34 leading to the opposed ends of a movable cylinder 36 which is slideably received on a stationary piston 38 having fixed thereto a piston rod 40 whose free end is connected at 42 to a relatively stationary part of the vehicle. The forward end of the cylinder 36 has connected thereto one end of a rod 44 whose opposite end is connected to an actuating arm 46 for operating gear shift mechanism generally designated by the numeral 48.

As so far described it will be apparent that when the shift lever 10 is moved in one direction or the other, say to the dotted line position 10′, the piston 22 will be moved correspondingly to the right to cause fluid to be displaced through the conduit 34 to the right hand end of slave cylinder 36 causing this to move to the right which in turn causes fluid on the left hand side of the piston 38 to be displaced to the left hand end of the master cylinder 24. This operation is entirely conventional and it will be apparent that should hydraulic fluid escape from one side to the other of either of the pistons 22, 38 it would result in one of the movable members of either the master or slave units being displaced ahead or behind of the other member so that the members do not occupy the same corresponding positions and are thus out of synchronism.

In accordance with the invention, any tendency for the movable members of the master and slave units to get out of synchronism is immediately followed by a compensating action which restores synchronism. This is accomplished by the use of a pair of fluid reservoirs 50, 52 carried on the cylinder 36 and whose interiors are partially filled with hydraulic fluid and respectively connected to the opposite end of the cylinder 36 by way of restricted passages 54, 56. The upper sides of the reservoirs are normally connected to atmosphere by way of ports 58, 60 and passages 62, 64 in the aforementioned slide valve member 30. This latter member is slideably received in a valve casing 66 which is integrally connected to the top of the reservoirs 50, 52 and thus is movable simultaneously with the cylinder 36.

The valve member 30 has a central part 68 of reduced diameter which forms with the interior of the casing 66 an inlet chamber 69 which is connected at all times by way of a port 70 and conduit 72 with a source of pneumatic pressure such as the reservoir 74 shown. The free ends of the slide valve member 30 are respectively provided with combined spring abutments and stop members 76, 78 against which bear ends of centering springs 80, 82 whose opposite ends bear against abutments 84, 86 on the valve casing to normally retain the slide valve 30 in the central position of the drawing. With the valve member in its center position both reservoirs 50, 52 are connected to atmosphere and the pneumatic pressure in reservoir 74 is sealed in by shoulders 88, 90 of the slide valve which form the end walls of the inlet chamber 69.

In operation, when the shift lever 10 is moved to the position 10′, for example, and fluid is displaced to the right end of slave cylinder 36 to cause this to move to the right as above explained, the Bowden wire 26 is also moved to the right by the movement of the shift lever causing the slide valve 30 to move to the right and if the slave cylinder 36 does not meet resistance greater than that offered by the restricted orifice 56 and is in synchronism with the master piston 22, the entire slave cylinder assembly including the valve member 30 follows the master piston 22 and moves to the right in unison, the valve 30 remaining in its center position and serving under these circumstances no particular function.

However, should the slave cylinder 36 meet a greater than normal resistance and thus not follow the master piston, a volume of fluid will be displaced by the master piston which is greater than the available space in the right hand end of the cylinder 36. Such excess fluid will be displaced upwardly into the space in the partially filled reservoir 52 through the restricted orifice 56 so that the shift lever 10 can be moved fully to its position 10' though the operator will obviously feel some resistance as the fluid on the right hand side of both the master and slave cylinders 24, 36 is forced through the restricted orifice 56. As the master piston 22 is moved into a position corresponding to the position 10' of the shift lever, make-up fluid would be required on the left hand side of the master piston 22 and this is derived by suction action from the left hand fluid reservoir 50 which is connected to the left end of the master cylinder 24 by way of restricted orifice 54, the left end of the slave cylinder 36 and conduit 32.

Assuming for purposes of illustration that during movement of the master piston as above explained, the slave cylinder does not move at all. Under these circumstances, as the shift lever 10 is forced to the position 10' and fluid is displaced out of and into the reservoirs 50, 52 through the respective orifices 54, 56 as above explained, the Bowden wire moves the slide valve member 30 to the right relative to the slave cylinder 36. As the slide valve is moved it compresses the spring 80 and the ends of both the atmospheric passages 62, 64 in the slide valve are moved out of communication with the ports 58, 60 and immediately thereafter inlet chamber 69 in the slide valve is moved into communication with the right hand port 60 thereby connecting the pneumatic pressure in reservoir 74 with the right hand reservoir 52. As soon as this occurs, the additional force exerted by the pneumatic pressure acting on top of the fluid in the reservoir 52 causes the fluid to be forced downwardly through the orifice 56 into the right hand side of the slave cylinder 36 causing this member to move to the right.

When the valve member 30 is first moved to the right to admit pneumatic pressure to the right hand reservoir 52, pressure at atmospheric level is trapped above the fluid in the left hand reservoir 50. Thus as the cylinder 36 is moved to the right thereby decreasing the volume of the cylinder on the left hand side of the piston, excess fluid therein is displaced upwardly through the orifice 54 into the reservoir 50 and compresses the air above the fluid, previously at atmospheric pressure, sufficiently to accommodate the displaced fluid.

As the cylinder 36 is moved to the right by the additional force of the pneumatic pressure, the entire slave assembly overtakes the valve member 30 which is now stationary with respect to the slave unit, until the shoulder 90 of the valve cuts off the supply of pneumatic pressure to the top of the reservoir 52 with continued movement of the cylinder 36 again connecting both of the reservoirs 50, 52 to atmosphere, whereupon the master and slave units are restored to synchronism.

In the event that the initial charge of pneumatic pressure is not sufficient to move the slave cylinder as above explained, the stop collar 76 on the valve member can engage the left hand end of the valve chamber and the force exerted through the Bowden wire by manual movement of the shift lever can be applied to the slave unit to further assist in moving this member mechanically.

It will be apparent that when the shift lever is moved to the right the foregoing action takes place but in reverse order. It will also be apparent that in addition to affording automatic synchronizing means for the master and slave units, the reservoirs 50, 52 also afford fluid replenishment sources for the hydraulic system to make up any fluid that might otherwise be lost by leakage.

It will be understood by those skilled in the art that the present invention provides an improved master-slave hydraulic remote control system wherein movement of a master control unit is accurately followed, with any tendency of the units to get out of synchronism being automatically overcome by the novel means herein described.

The present invention is susceptible of a wide variety of changes and modifications without, however, departing from the scope and spirit of the appended claims.

What is claimed is:

1. In combination with a remote control system including a pair of hydraulically connected master and slave units and means for imparting movement to said master unit for effecting corresponding movement of said slave unit, a hydraulic reservoir connected to said slave unit, a source of pneumatic pressure, normally closed valve means for controlling a connection between said source of pneumatic pressure and said reservoir, means to retain said valve in closed position when the movement of said slave unit corresponds to the movement of said master unit, and means responsive to the movement of said master unit to move said valve means to open position when the movement of said slave unit does not correspond with the movement of said master unit.

2. In combination with a remote control system including a pair of hydraulically connected master and slave units and means for imparting movement to said master unit for effecting corresponding movement of said slave unit, a hydraulic reservoir connected to said slave unit, a source of pneumatic pressure, normally closed valve means for controlling a connection between source of pneumatic pressure and said reservoir, means including a connection between said master unit and said valve means to retain said valve means in closed position when the movement of said slave unit corresponds to the movement of said master unit, and means operatively connecting said valve means with said slave unit to move said valve means to open position when the movement of said slave unit does not correspond to the movement of said master unit.

3. In combination with a remote control system including a pair of hydraulically connected master and slave units and means for imparting movement to said master unit for effecting corresponding movement of said slave unit, a hydraulic reservoir connected to said slave unit, a source of pneumatic pressure, normally closed valve means for controlling a connection between said source of pneumatic pressure and said reservoir, means for maintaining said valve means in normally closed position when the movement of said slave unit corresponds to the movement of said master unit, and means responsive to the relative movement of said master unit with respect to said slave unit for moving said valve means to open position when the movement of said slave unit does not correspond to the movement of said master unit.

4. The combination of claim 3 wherein said valve comprises a casing element and a valve element movable with respect to said casing, one of said elements being operatively connected to said master unit for movement therewith and the other of said elements being operatively connected to said slave unit for movement therewith.

5. Means for synchronizing hydraulically connected master and slave motor units having respective interconnected expansible chambers, said units being arranged that a change in the degree of expansion of the chamber of the master unit is normally reflected in a corresponding change in the degree of expansion of the chamber of said slave unit, a hydraulic fluid reservoir connected to the expansible chamber of said slave unit, a source of pneumatic pressure, valve means between said source of pneumatic pressure and said fluid reservoir, said valve means normally occupying a first position connecting said reservoir to atmosphere but being movable to a second position to disconnect said reservoir from atmosphere while connecting the former to said source of pneumatic pressure, and means responsive to change in the degree of expansion of the chamber of said master unit to move said valve means to its second position only when the change in degree of expansion of the chamber of said slave unit does not correspond to the change in degree of expansion of the chamber of said master unit.

6. The synchronizing means of claim 5 including a restricted orifice in the connection between said reservoir and the expansible chamber of said slave unit.

7. The combination of claim 1 wherein the means to move the valve means comprises a single Bowden wire connected between the master unit and the valve means.

8. The combination of claim 2 wherein the means connecting the master unit with the valve means comprises a single Bowden wire.

9. The combination of claim 3 wherein the valve means and the master unit comprises a single Bowden wire.

References Cited in the file of this patent

UNITED STATES PATENTS

| | | |
|---|---|---|
| 228,555 | Pike | June 8, 1880 |
| 2,239,893 | Jackman | Apr. 29, 1941 |
| 2,585,389 | Kehrl | Feb. 12, 1952 |
| 2,927,431 | Pitts | Mar. 8, 1960 |